July 5, 1949.  R. E. MITTON  2,475,105
FLUID PRESSURE BOOSTER
Filed Sept. 11, 1944  2 Sheets-Sheet 1
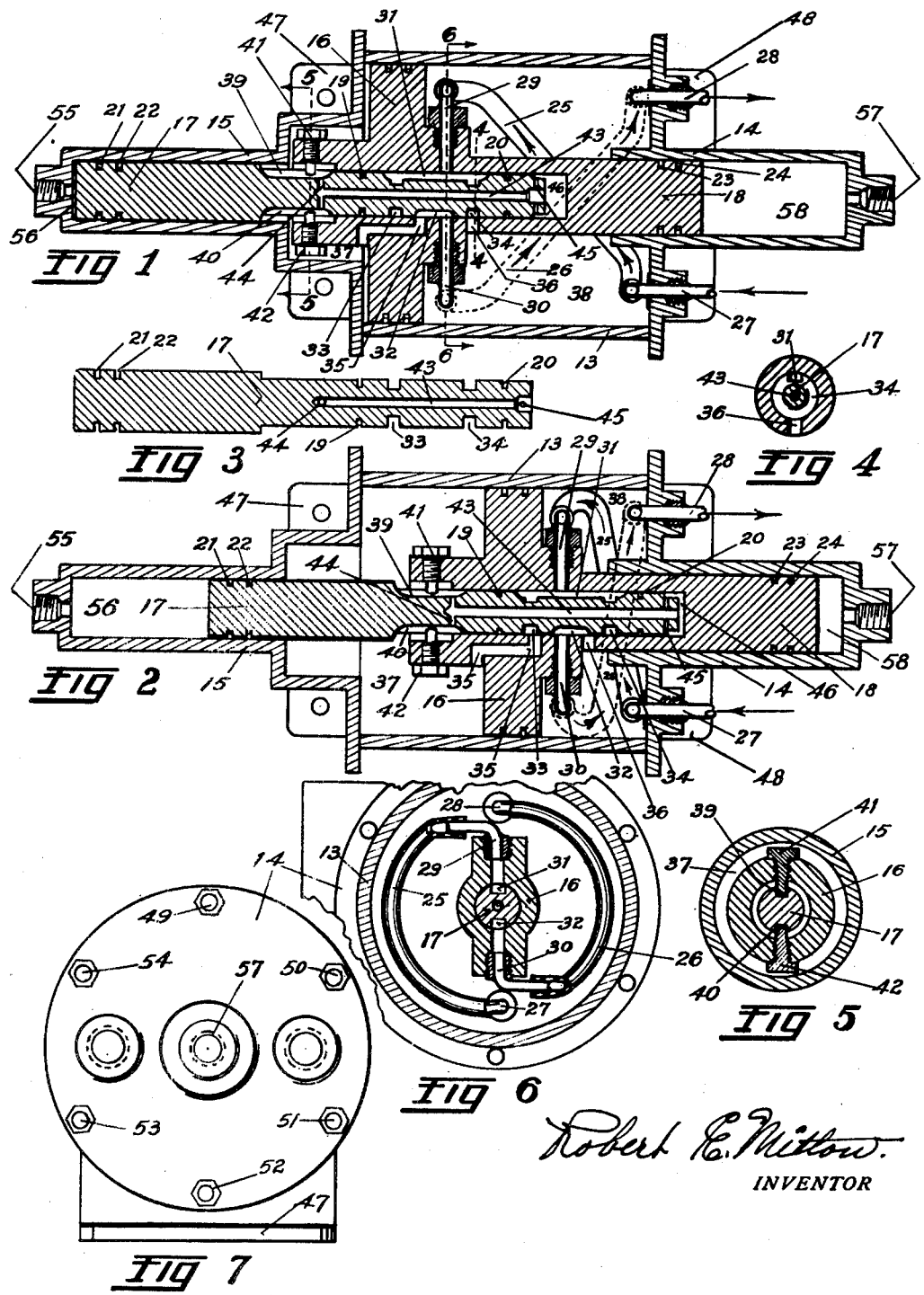
Robert E. Mitton
INVENTOR

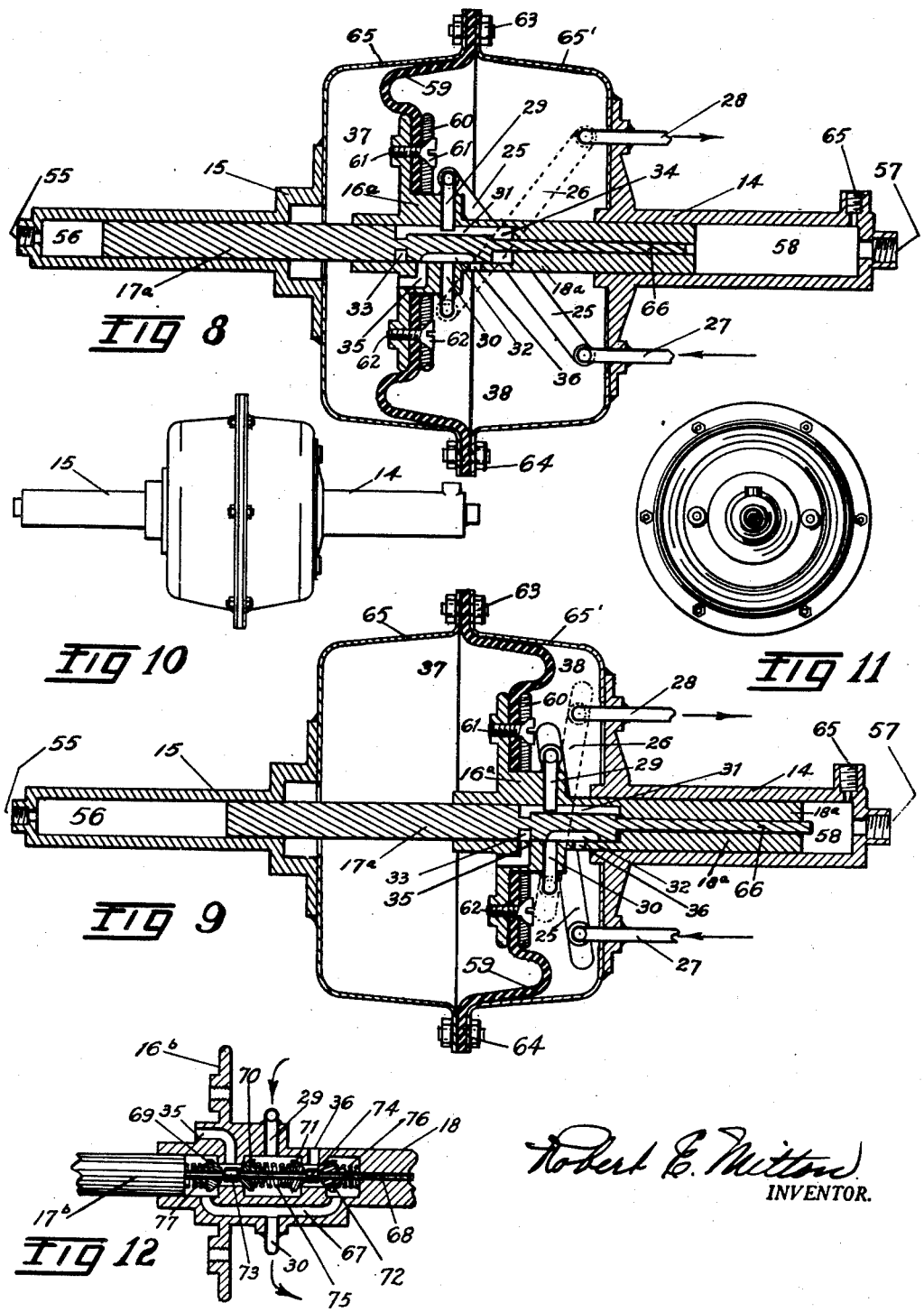

Patented July 5, 1949

2,475,105

UNITED STATES PATENT OFFICE 2,475,105

FLUID PRESSURE BOOSTER

Robert E. Mitton, Lemon Grove, Calif.

Application September 11, 1944, Serial No. 553,657

3 Claims. (Cl. 60—54.6)

My invention relates to devices for the accurate graduation, control and transmission of high fluid pressures to actuate all types of mechanisms or devices which require such fluid pressure in order to operate effectively.

A primary object of my invention is to improve and simplify the design, construction, application and operation of such devices, by providing a structure involving a minimum number of moving parts and comparatively few points of potential leakage.

Another object is to provide means to effectively apply, release and utilize the pressure exerted by such devices, under control of directly applied fluid pressure transmitted by the operator of the device in a structure capable of delivering an equal, or greater volume of fluid output to do useful work, in proportion to the volume of fluid input delivered by the operator to actuate the device.

A further object is to provide means whereby all of the control and actuating motive pressure may be fully utilized, in a structure requiring none of the motive pressure to overcome the resistance of springs, toggles or similar sources of frictional resistance.

A still further object is to provide a valve mechanism directly sealed by applied fluid pressure, in a fluid actuated pressure governor effectively operable by either the force of hydraulic pressure, compressed air or vacuum, or by any combination of the said forces, the structure involving a power releasing as well as a power applying action transmitted through flexible tubing fully enclosed in the housing of the device.

The said objects, and others, as will appear, are attained by the device to be hereinafter described and explained by reference to the drawings in which, Figures 1 to 7 inclusive, show details of the device involving a motive cylinder and reciprocating piston movable by the motive fluid pressure as an example of this type of construction.

Figures 8 to 11 inclusive, show details of the device equipped with a slightly different alternative sleeve valve, involving a motive fluid power chamber and flexible diaphragm, instead of the above mentioned motive cylinder and piston, exemplifying this type of construction.

Figure 12 shows a double acting poppet valve arrangement, which, on occasion, may be substituted in the place of either sleeve valve previously referred to. It will be obvious that any one type of valve illustrated might be adapted for use in any type of construction or in either type shown, to secure a desired functional characteristic or to utilize different motive fluid elements to actuate the device.

In the drawings Fig. 1 is a lateral section showing the position of parts when the device is in the release position.

Figure 2 is a similar section showing the device in the applied position.

Figure 3 is a vertical section through the middle of the sleeve valve illustrated in Figs. 1 and 2.

Fig. 4 is a section on line 4—4 indicated in Fig. 1.

Fig. 5 is a section on line 5—5 indicated in Fig. 1.

Fig. 6 is a section on line 6—6 indicated in Fig. 1.

Fig. 7 is an external elevation of the right end of the fully assembled structure.

Figure 8 is a lateral middle section of the alternative diaphragm type of construction and alternative valve, showing the position of parts when the device is in the release position.

Figure 9 is a similar section showing the device in the applied position.

Fig. 10 is an external side elevation of the fully assembled structure, shown on a reduced scale.

Fig. 11 is an external end view of the device fully assembled, shown on a similarly reduced scale.

Fig. 12 is a partly sectioned broken view showing certain parts as external elevations in place in a lateral middle section through certain ports and passages to be hereinafter referred to.

Having now generally described the various illustrations, I proceed to the detailed description of Figures in the drawings and refer back to Fig. 1 in which the two screws 41 and 42 and the flexible tube 25 are illustrated as external views shown installed in place, while the flexible tube 26 is indicated in dotted outline. All other parts in this view are shown in section illustrating the piston type of construction in which: A cylinder 13 is secured between the end caps 14 and 15. The said caps 14 and 15 embody concentric longitudinal projections, while a fluid pressure actuated piston 16 also embodies a similar cylindrical projection 18. The piston 16 is slidably carried in the cylinder 13, while the projection 18 is slidably carried in the cylindrical projection of the cap 14. A control valve piston 17 is slidably carried in the cylindrical projections embodied on the cap 15 and the piston 16; thus the caps 14 and 15 and the cylinder 13 form the housing as well as the cylinders in which the motive pressure actuated piston 16, the control valve piston 17 and the pressure delivery piston 18, slide.

Piston rings 19, 20, 21, 22, 23 and 24 are shown in place in their respective circumferential grooves on each piston to represent a sealing medium although it will be obvious that other types of sealing devices, such as graphite cord packing, cup leathers or rubber cup washers might be employed instead of the said rings, which are only indicative that the pistons are to be sealed at the approximate positions indicated.

The piston type construction, Fig. 1, is closely paralleled by many parts of the diaphragm construction, Fig. 8, and some of the said parts are exactly similar in function, therefore similar numerals are used in Fig. 8 to designate corresponding parts, which function exactly alike in the two structures, however, in order to differentiate, those parts in Fig. 8, which are constructed and which function differently, are designated by similar numerals followed by the letter "a," while such parts in Figure 12, are followed by the letter "b." It is obvious that such similar parts may be adapted to being interchangeable in the different structures, as, for example, the valve 17 in the piston type structure together with the pressure piston 18 in which the valve is slidably carried, may be adapted to operate in the diaphragm type of construction in place of valve 17a and piston 18a shown in the latter structure, Fig. 8, and vice versa, while the poppet valve arrangement Fig. 12 may be adapted to operate in either structure in substitution for corresponding parts, should such substitution to meet specific requirements or fulfill desired functions be necessary.

It is pointed out that, while no piston rings or equivalent sealing elements as recited hereinabove are shown in the diaphragm structure, Figs. 8 and 9, they will be necessary or desirable in this type of construction also, but are omitted from these views as superfluous in view of the previous illustration and explanation of the location and function of these sealing elements indicated in Figs. 1, 2 and 3.

In Figures 1 and 2, a pair of internally and spirally installed flexible connecting tubes to convey the motive fluid into and out of the device are indicated, showing an external relief elevation of the pressure inlet tube 25, and the exhaust or outlet tube 26, which is indicated by dotted outline.

The inlet pressure tube 25 conveys the motive fluid into the structure from a source of such pressure connected by tubular means to the pipe fitting 27 which is also openly connected to the flexible tube 25 as shown. The other end of the flexible tube 25 is openly connected to another pipe fitting 29 which conveys the motive pressure into the bore in which the piston valve 17 slides.

The exhaust or outlet passage is formed by the flexible tube 26 shown in dotted outline and which is openly connected to the pipe fittings 28 and 30 to complete the conduit through which the motive fluid passes out of the device and connecting the bore in which the sleeve valve piston 17 slides, with the external pipe fitting 28, which may be connected to an externally attached pipe or conduit through which pressure below atmospheric density may be ejected by vacuum when connected with a source of suction, or the said pipe fitting 28 may be externally left open for the discharge of motive fluid to the atmosphere, when the said motive fluid is utilized to operate the device, of a density above atmospheric or pressure above atmospheric pressure.

The flexible tubes above referred to may be installed in the device in any manner which does not prevent the reciprocating action of the piston 16, but preferably attached in the spiral manner shown, coiled about the circumferential exterior of the cylindrical projection forming the pressure piston 18 and enclosed in the cylinder 13. This construction allows the device to operate freely with a minimum of resistance to the action of the piston 16, since the flexible tubing can follow the movements of the said piston, the said movements alternately collapsing and extending the said coils, during the operation of the device.

The valve illustration in Figures 1 and 2 show two milled depressions or slots 31 and 32, sectioned through the middle in the piston valve 17. The longer top slot 31 is the inlet slot and is always in open connection with the inlet passage 29. The shorter bottom slot 32 is the outlet slot and is always in open connection with the outlet passage 30 and when shifted by the movement of the valve the said outlet slot 32 may be alternately connected with the feeder ports 35 and 36 to form open connection with either port when brought into alignment with either of the said ports.

A pair of circumferential grooves which intersect with, and are in open connection with, the inlet slot 31, are designated by the numerals 33 and 34. They are provided as shown in the piston valve 17, to convey the motive pressure to the working face of the valve and are cooperative to alternately align with two feeder ports 35 and 36 which are open bypasses connecting the working face of the sleeve valve with the expansion chambers 37 and 38, port 35 connecting expansion chamber 37 and port 36 connecting expansion chamber 38.

Means to prevent the rotation of the sleeve valve without interfering with its reciprocation, is provided by two screws which project into two longitudinal slots. These slots are designated by the numerals 39 and 40, while the said screws are designated by the numerals 41 and 42, as shown in Figures 1, 2 and 5. Dual screws and slots are illustrated; however it is obvious that one slot and screw properly locked in position by a cotter key or other suitable means could be effectively used, or that these could be entirely dispensed with if a suitably devised tubular projection of the pipe connection 29 is installed in a manner to extend into the longitudinal pressure slot 31 as exemplified by the projecting tubular fitting 29 as shown in Fig. 8.

The section of the sleeve valve piston, Figures 1, 2 and 3, shows a concentric fluid communication bore 43 which may be suitably connected by open perforations 44 and 45, establishing an open connection between the expansion chamber 37 and the comparatively small valve release expansion chamber 46 provided at the end of the piston valve 17.

In Figures 1 and 2, a threaded pipe connection opening 55 is provided in the extreme end of the hollow cylindrical cap 15 and opening into the control expansion chamber 56. To the said opening 55 a pipe or tube to convey actuating fluid pressure governing the movement of the piston valve 17, may be connected with a source of such valve actuating pressure, which is conveyed into and out of the expansion chamber 56.

Another similar threaded pipe connection opening 57 is provided in the extreme end of the hollow cylindrical cap 14 and opens into the fluid pressure expansion chamber 58. To this opening 57, a delivery pipe or tube to convey high pressure fluid to do useful work, may be connected with the device to be actuated by the said fluid pressure.

Fig. 3 shows in section the circumferential grooves 33 and 34 as well as the concentric communication passage 43, together with the perforations 44 and 45, the valve piston 17 and ring grooves 19, 20, 21 and 22. This view does not show the milled longitudinal depressions or slots 31 and 32 since the said valve is sectioned on a plane which cuts between the said slots.

Fig. 4 is a section on line 4—4 through elements of the valve, shown in section and indicated in Figure 1, in which is shown another view of the circumferential groove 34, the valve section 17, the concentric communication bore 43, the feeder port 36 and the pressure inlet slot 31.

Figure 5 is a section on line 5—5 of Fig. 1 through a hollow projection of motive piston 16, positioning screws 41 and 42, slots 39 and 40, valve piston 17, and shows a portion of the expansion chamber 37 as well as a section of the end cap 15.

Figure 6 is a section on line 6—6 through the cylinder 13, part of the tubes 25 and 26, the valve 17, part of the piston 16, the slots 31 and 32, and the pipe or tube fittings 27, 28, 29 and 30 are shown, 27 and 28 as external relief views shown installed in place, while the fittings 29 and 30 show in section in a slightly modified form, in the interest of clearer illustration.

Figure 7 is an external end elevation of the entire structure shown fully assembled, in which may be seen the method of securing the end caps upon the respective ends of the cylinder by means of tie rods and lock nuts indicated by the numerals 49, 50, 51, 52, 53 and 54. The tie rods mentioned extend the full length of the cylinder 13 and pass through holes provided to receive them in the projecting flanges of the cylinder caps 14 and 15. This view also shows the pipe connection openings provided to receive the pipe fittings 27 and 28 as well as the pipe connection opening 57 shown in Figs. 1 and 2. A type of mounting flange or base 47 is also shown in Figure 7 and also in Figs. 1 and 2 in which the said base forms an integral part of either cap 14 or 15. These flat mounting bases are provided with suitable holes through which bolts may be passed to secure the device in any desired position and are designated in Figs. 1 and 2 by the numerals 47 and 48.

The opening 57 is connected by a fluid line to a brake cylinder or other motor device. When the pressure in chamber 56 is released, the pressure of the returning fluid from this brake cylinder acts on the pistons 16 and 18 to apply pressure on the fluid in chamber 37 after the valve 17 has closed the port 35 by its movement to the left. It is this pressure in the chamber 37 that acts through the bore 43 to move the valve 17 to the left to open the port 36 to the pressure fluid and port 35 to the exhaust.

Figure 8 is a longitudinal section showing an example of the diaphragm type of construction, involving a somewhat different type of control valve action and valve construction. In this type of assembly the motive fluid is alternately exerted on opposite sides of a flexible diaphragm 59 which is secured to the piston flange 16a by the plate 60 which is attached by means of the screws 61 and 62 and secured at its outer edge by means of nuts and bolts 63 and 64, the said bolts being passed through holes provided in the outer flanges of the shells 65 and 65' which may be welded as shown to the caps 14 and 15 or attached by other suitable means.

In Figure 8 the flexible tubes 25 and 26 as well as the pipe fittings 27, 28, 29 and 30 may be arranged identically as heretofore explained and the threaded open pipe connections 55 and 57 at opposite ends of the assembly are identical with those shown in Figures 1 and 2; however in Fig. 8 an additional threaded pipe connection opening 65 is provided which may be included in either type of construction as a means to connect a check valve and fluid supply line to replenish any fluid which might be lost from chamber 58 through leakage.

Figure 8 discloses an alternative type of sleeve valve construction in which the concentric communication passage previously described is eliminated. This valve 17a has a concentrically projecting pin 66 which forms an elongated miniature piston slidably extending completely through and closely fitting in a concentric bore provided in the pressure piston 18a. As shown the end of the said piston pin 66 is always in open connection with the pressure fluid chamber 58 and consequently is subject to the reaction of all pressure which may be created therein.

The view in Fig. 8 also discloses a slightly different sleeve valve port arrangement, in which the longitudinal pressure outlet slot 32 is relatively longer than the previously described slot, being adapted to connect the three ports 35, 30 and 36 and place these three ports in open connection with each other simultaneously, thereby connecting both expansion chambers 37 and 38 with the outlet tubular elements 30, 26 and 28, releasing all pressure from both sides of the diaphragm 59 when the valve 17a is in the central position shown, but permitting the instant delivery of fluid pressure to either side of the said diaphragm when the valve is shifted to either side as indicated by the advanced position assumed by the valve in Fig. 9.

In Figures 8 and 9 it will be noted that in this alternative valve 17a the pressure inlet circumferential grooves 33 and 34 are extended slightly further apart, excluding the fluid pressure from either side of the diaphragm 59 when the valve is placed in a central position as shown in Fig. 8.

At this point it is carefully pointed out that by the sole alteration of this structure, Fig. 8, of moving the feeder ports 35 and 36 slightly farther apart until they align with the circumferential grooves 33 and 34 that the valve as illustrated would then deliver pressure to both sides of the diaphragm 59 and exclude the exhaust of such pressure, but nevertheless would permit the instant release of such pressure from either side of the said diaphragm or the ejection of such pressure from either side of the same when the valve is shifted toward either side of the said diaphragm.

Obviously this minor change of construction results in an entirely different functional operation, but the explanation of this alteration in the preceding paragraph hereof should suffice to establish the conception of this adapation of the device as illustrated in Fig. 8, without departing from the spirit of the invention.

Figures 10 and 11 show, respectively, the external side and end view of the completely assembled structure shown in section in Figures 8 and 9. In Figure 10 it will be noted that the pressure delivery cylinder 14 is larger than the control cylinder 15 and as indicated by the proportions illustrated in the sectioned figures cylinder 14 carries a larger piston than does the cylinder 15 and consequently displaces appreciably more volume of fluid. This is pointed out at this time, as it is an important element pertinent to the operation, to be hereinafter explained.

Figure 12 shows the flanged piston 16b in section through a somewhat altered port arrangement, having an added connecting passage 67 and the feeder ports 35 and 36 shifted to the relatively opposite side of the sectioned piston plate and projection 18, but retaining in substantially the same form the pressure inlet port 29, the outlet port 30 and the pressure piston 18, as well as to bore in which the valve release piston pin 68 is slidably carried.

In Fig. 12, a concentrically attached rigid pin 68 is secured to the valve piston 17 and extends completely through the pressure delivery piston 18 slidably carried and closely fitted into the bore provided therein.

Slidable poppet valves 69, 70, 71 and 72 illustrated as being of a tapered design, but which could also be used effectively if designed as flat poppet valves, are movably mounted on the pin 68 as shown in Figure 12. Valve actuating collars 73 and 74 are rigidly secured on the said pin 68 by a suitable means, each collar in the position shown between a corresponding set of poppet valves, with the said valves seated against the edges of reduced bores provided as shown. These poppet valves are normally held against their respective seats by the pressure of the valve springs 75, 76 and 77. The poppet valves 70 and 71 are the inlet valves through which the motive fluid is delivered to actuate the device when they are alternately opened, while the poppet valves 69 and 72 are the outlet valves through which the motive fluid is ejected or exhausted during the operation of the device and the alternate opening of the said outlet valves. Alternate poppet valves of each pair of valves are opened by the alternate contact of the collars 73 and 74 when the pin 68 is moved. The inlet valves 70 and 71 are normally held shut by a single spring 75, while the outlet valves 69 and 72 are normally held shut by the respective springs 77 and 76.

The description of operation is first directed to the piston type construction illustrated in Figures 1 to 7 inclusive. When this mechanism is actuated by a combination of forces, such as, for instance, hydraulic pressure to actuate the sleeve valve 17 and compressed air to actuate the motive piston 16. The fitting 27 is connected by tubular means to a source of compressed air which is conveyed through the said fitting 27 in the direction of indicating arrows shown, through the flexible tube 25, into and through the fitting 29, into the longitudinal slot 31 and intersecting annular grooves 33 and 34. This forms an open connection to convey the compressed air and maintain air pressure from the compressed air supply continuously in the said grooves 33 and 34. With the valve 17 in release position, Fig. 1, the pressure groove 34 is aligned with the feeder port 36 through which the compressed air passes into the expansion chamber 38, forcing the piston 16 to the left or release position. Exhaust of air from the opposite chamber 37 is accomplished by the passage of air out of the said chamber 37 through the feeder port 35, thence through the exhaust slot 32, thence through the fitting 30, thence through the flexible tube 26 in the direction of indicating arrows out through fitting 28 to the atmosphere.

With the control valve 17 in applied position, Fig. 2, the alternate pressure groove 33 is aligned with the feeder port 35 through which the compressed air then passes into the expansion chamber 37, forcing the motive piston 16 to the right or applied position. Exhaust of air from the previously charged chamber 38 is effected by the passage of same out of the chamber 38 through the feeder port 36, thence through the exhaust port slot 32, thence through the fitting 30, thence through the flexible tube 26 in the direction of indicating arrows out through fitting 28 to the atmosphere.

When the control valve 17 is in a central position, midway between the released and applied position, both pressure grooves 33 and 34 are closed, holding the compressed air and excluding it from access to either chamber 37 or 38. Similarly, the feeder ports 35 and 36 are both closed when the valve is in this position. Thus any movement of the valve in either direction from the central position will admit pressure to one side and exhaust pressure from the opposite side of the motive piston 16 to propel the said motive piston in either corresponding direction in which the valve 17 is shifted, until the valve is again in a relative central position. In this way the motive piston 16 is forced to follow every movement of the said valve 17 in either direction from a central position, and by sliding over the said valve when moved, the piston 16 always automatically re-establishes the relative central position.

Steam, gas or other expansible fluid may be utilized to actuate the device instead of compressed air referred to in the description of operation, or liquid fluid adapted to serve as a hydraulic actuating medium delivered under pressure to the inlet passages described, would accomplish the same purpose.

When the motive piston 16 is to be actuated by vacuum a source of suction is connected by tubular means to the exhaust or outlet pipe fitting 28 through which the atmospheric pressure is ejected from the device, while the inlet opening 27 is left open to allow the influx of atmospheric pressure. When the valve 17 is in the release position, Fig. 1, under these conditions, the atmospheric pressure in chamber 37 is ejected by the suction through the feeder port 35, thence through the exhaust slot 32, thence through the fitting 30, thence through the flexible tube 26 in the direction of indicating arrows, out through fitting 28 and to the source of suction. Influx of atmosphere passes through the open fitting 27 and flexible tube 25 in the direction of indicating arrows, thence through fitting 29 into pressure slot 31 and pressure groove 34, thence through feeder port 36 into the expansion chamber 38.

When the control valve 17 is in the applied position, Fig. 2, during such vacuum operation, the atmospheric pressure is then ejected from chamber 38 by the suction through the feeder port 36, thence through the exhaust slot 32, thence through the fitting 30, thence through the flexible tube 26 in the direction of indicating arrows, out through fitting 28 to the source of suction. Influx of atmosphere passes through the open fitting 27 and flexible tube 25 in the direction of indicating arrows, thence through fitting 29 into the pressure slot 31 and pressure groove 33, thence through feeder port 35 into the expansion chamber 37.

When the control valve is in a central position during such vacuum operation, midway between the applied and released positions, both pressure grooves 33 and 34 are closed, excluding the influx of atmospheric pressure to either chamber 37 or 38, similarly the feeder ports 35 and 36 are both closed when the valve is in this position since neither is opened by the vacuum slot 31 or the feeder grooves 35 or 36. Thus any movement of the control valve 17 in either direction will admit atmosphere to one side and eject atmosphere from the opposite side of the motive piston 16, propelling the said piston by atmospheric pressure toward either corresponding direction toward which the valve 17 is shifted from such central position until the movement of the piston 16 again brings the valve 17 into a relatively central position, and causing the piston 16 to accurately follow the movements of the control valve 17, by the force of applied fluid actuating power, in either direction.

The operation of the valve 17 to control the movement of the motive piston 16 is accomplished by exerting fluid pressure in the chamber 56 which forces the valve 17 into the piston 16 until the port 35 is aligned as shown in Figure 2 with the groove 33, thus applying fluid pressure from the inlet 27 into the chamber 37, which forces the piston 16 to compress the fluid in chamber 58. When the pressure is released in the chamber 56, the valve 17 will return to its original position and align the groove 34 with the port 36. The valve 17 is forced to this position as the pressure in the chamber 37 feeds into the chamber 46 by means of slot 40, the perforation 44 and 45, and the bore 43. As there is pressure in the chamber 46 and none in the chamber 56, the valve 17 will move to the position shown in Figure 1.

A suitable pipe or tubular connection is attached to the pipe fitting opening 57 for the delivery of high fluid pressure from the pressure chamber 58, said pressure being created by the movement of the pressure piston 18 in the chamber 58 against a head of fluid which is delivered under pressure to any device requiring such high fluid pressure in the course of its operation.

The operation of the diaphragm type of construction, involving the alternative sleeve valve 17a, shown in Figures 8 to 11 inclusive, is similar in many respects to the operation of the piston type and many of the parts are identical. The arrangement of the flexible tubes 25 and 26 and the pipe fittings to which the said tubes attach 27, 28, 29 and 30 are identical, as well as the discharge pressure port 57 and the valve actuating fluid connection 55, are identical in both construction and function, with the previously described piston type. However, the different arrangement and action of the alternative sleeve valve necessitates a further description of operation with reference to this assembly; Figure 8, in which, when the device is operated by pressure above atmospheric pressure, either pneumatic or hydraulic pressure is delivered by suitable means to the inlet 27, thence through the flexible tube 25, thence through the fitting 29 to the pressure slot 31 and the pressure grooves 33 and 34, while the valve 17a is in the central position shown in Fig. 8, the pressure from both sides of the diaphragm 59 is discharged through the partly open feeder ports 35 and 36, thence through the exhaust slot 32, thence through the fitting 30, thence through the flexible tube 26, thence through and out of the fitting 28 to the atmosphere. When the valve 17a is in this position, Fig. 8, the fluid pressure in the grooves 33 and 34 is excluded from either side of the diaphragm because the said grooves are not in alignment with any port connecting to either side of the said diaphragm, and the working face of the valve 17a effectively seals the fluid motive pressure from the feeder ports 35 and 36 by the reaction of said fluid pressure on the side of the sleeve valve opposite the said feeder ports.

When the valve is moved into the applied position, Fig. 9, by means of fluid pressure exerted in chamber 56, the pressure groove 33 is brought into alignment with feeder port 35 admitting the pressure into expansion chamber 37, while the pressure in chamber 38 is discharged through the exhaust slot 32 as hereinabove explained.

When the valve is moved into a release position by the release or relaxation of pressure in control chamber 56 and the pressure exerted on the end of the pin 66, the pressure groove 34 is brought into alignment with the feeder port 36, admitting the pressure into the other expansion chamber 38, while the pressure in chamber 37 is then discharged through the exhaust slot 32 as previously explained. As the brake cylinder connected to the opening 57 maintains a pressure in the chamber 58 after the release of the pressure in the chamber 56 this pressure will act uopn the end of the pin 66 or 68 and move same to the left. As the pins 66 and 68 are extensions of the valve 17a they force the valve 17a to the left, reversing the valve ports and cutting off the pressure to the chamber 37, permitting the piston 16a to move to the left.

This valve action involves an applied holding position, which is midway between the applied and central positions, in which the pressure previously admitted to chamber 37 is trapped and sustained in the said chamber by the closing of the feeder port 35 when the valve is in the said position, and also involves a release holding position, which is midway between the release and central positions, in which the pressure previously admitted to chamber 38 is trapped and sustained in the said chamber by the closing of the other feeder port 36 when the valve is in the latter position.

Alternate pressures as above explained, actuate the flexible diaphragm 59 and the attached flanged piston 16a and pressure piston 18a, alternately delivering and releasing high pressure out of the pipe connection 57 in accordance with the movement of the control valve 17a.

The poppet valve arrangement shown in Fig. 12, may be adapted to either the piston or diaphragm type structure; however in order to set forth the operation of same it is assumed that the piston 16b is attached in place of the piston 16a in Fig. 8 and Fig. 9, with valve 17b substituted for valve 17a, pressure piston 18 carrying the pin 68, instead of pin 66, passing concentrically through the said piston in a similar manner and with the diaphragm, chambers, as well as flexible tubes and fittings being identically arranged as shown in the said Figures 8 and 9. Under these conditions, when the valve is actuated by pressure exerted in control chamber 56, the valve 17b is moved to the applied position, moving the pin 68 and attached rigid collars 73 and 74, opening the poppet valves 70 and 72 and admitting the pressure from inlet fitting 29 through the feeder port 35 into the chamber 37 and exhausting the pressure in chamber 38 through the feeder port 36, the passage 67 and the outlet port 30. When the valve is moved to release position by the release or diminishment of pressure on control piston 17b and the pressure against pin 68, the rigidly attached collars on the said pin, 73 and 74, open the alternate poppet valves 69 and 71, admitting the motive pressure from inlet fitting 29 through the feeder port 36 into the chamber 38 and exhausting the pressure from chamber 37 through the feeder port 35, the passage 67 and the outlet port 30. The central holding position as shown in Fig. 12, precludes the admission or exhaust of pressure from either side of the diaphragm 59 which forms the partition between the chambers 37 and 38 and when the poppet valve type is in the central position shown in Figure 12, the specific pressure which may be in either chamber 37 or 38 will be trapped and sustained until the valve is moved.

It is pointed out that in either the piston or diaphragm type structure, when the valve is in the applied position, a solid contact between the valve and the pressure piston 18 is formed whereby the pressure exerted in control chamber 56 may be applied to actuate the pressure piston 18 or 18a, or that the control pressure exerted in chamber 56 may thus be added to the pressure exerted on pressure piston 18 or 18a by the fluid pressure in expansion chamber 37.

Having thus illustrated and explained my invention, I desire to secure by Letters Patent and claim:

1. In a pressure booster, primary, power, and booster cylinders in concentric alignment, a fluid responsive member movable in said power cylinder and having a piston attached thereto which slides in said booster cylinder, valve means slidable in said primary cylinder and said fluid responsive member, ports in said member and in said valve to alternately align a pressure fluid supply and a discharge line with opposite sides of said fluid responsive member whereby when pressure is applied in said primary cylinder, said valve aligns said ports to permit said fluid pressure to move said fluid responsive member and compress fluid in said booster cylinder and fluid responsive means actuated by pressure in said booster cylinder derived by the back pressure on a brake cylinder to return said valve and align said ports to return said fluid responsive member to its original position when the pressure in said primary cylinder is released.

2. In a pressure booster, primary, power, and booster cylinders in concentric alignment, a fluid responsive member movable in said power cylinder and having a piston attached thereto which slides in said booster cylinder, valve means slidable in said primary cylinder and said fluid responsive member, ports in said member and in said valve to alternately align a pressure fluid supply and a discharge line with opposite sides of said fluid responsive member whereby when pressure is applied in said primary cylinder, said valve aligns said ports to permit said fluid pressure to move said fluid responsive member and compress fluid in said booster cylinder, a piston attached to said valve and responsive to fluid pressure in said booster cylinder derived by the back pressure from a brake cylinder to return said valve and align said ports to return said fluid responsive member to its original position when the pressure in said primary cylinder is released.

3. In a pressure booster, primary, power, and booster cylinders in concentric alignment, a fluid responsive member movable in said power cylinder and having a piston attached thereto which slides in said booster cylinder, valve means slidable in said primary cylinder and said fluid responsive member, ports in said member and in said valve to alternately align a pressure fluid supply and a discharge line with opposite sides of said fluid responsive member whereby when pressure is applied in said primary cylinder, said valve aligns said ports to permit said fluid pressure to move said fluid responsive member and compress fluid in said booster cylinder, a piston carried by said valve and sliding in a cylinder in said pressure responsive member, said cylinder having passage means connecting same with the power cylinder on the side of said pressure responsive member that is aligned with pressure fluid to compress said booster cylinder.

ROBERT E. MITTON.

REFERENCES CITED

The following references are of record in the file of this patent:

UNITED STATES PATENTS

| Number | Name | Date |
|---|---|---|
| 959,417 | Anderson | May 24, 1910 |
| 1,770,194 | Bragg | July 8, 1930 |
| 2,220,339 | Leathem | Nov. 5, 1940 |
| 2,260,491 | Stelzer | Oct. 28, 1941 |
| 2,275,697 | Stelzer | Mar. 10, 1942 |
| 2,307,910 | Baade | Jan. 12, 1943 |
| 2,360,578 | Porter | Oct. 17, 1944 |
| 2,365,471 | Ingres | Dec. 19, 1944 |
| 2,374,545 | Ingres | Apr. 24, 1945 |

FOREIGN PATENTS

| Number | Country | Date |
|---|---|---|
| 2,024 | Great Britain | July 4, 1872 |